United States Patent [19]

Branz et al.

[11] Patent Number: 5,442,997
[45] Date of Patent: Aug. 22, 1995

[54] AUTOMATED COOKING APPARATUS

[75] Inventors: Michael A. Branz, Spartanburg; Michael D. Black, Greenville; Harry A. Brancheau, Inman; James H. Jenkins, Spartanburg, all of S.C.

[73] Assignee: Specialty Equipment Companies, Inc., Berkeley, Ill.

[21] Appl. No.: 68,681

[22] Filed: May 27, 1993

[51] Int. Cl.$^6$ .................. A47J 27/04; A23L 3/10; A23L 3/16

[52] U.S. Cl. .................. 99/330; 99/331; 99/348; 99/357; 99/359; 99/516; 99/533; 366/101; 366/106

[58] Field of Search .................. 99/330–334, 99/357, 516, 359–371, 419, 483, 532, 348, 533, 516; 426/523; 165/48.1, 61, 63, 64, 918, 919, 909; 219/401; 366/101, 106

[56] References Cited

U.S. PATENT DOCUMENTS

| | | | |
|---|---|---|---|
| 3,139,343 | 6/1964 | Baselt | 99/359 |
| 4,119,020 | 10/1978 | Sharp et al. | 99/419 |
| 4,250,959 | 2/1981 | Spasjevic | 165/61 |
| 4,291,617 | 9/1981 | Miller et al. | 99/483 |
| 4,452,132 | 6/1984 | Miller et al. | 99/516 |
| 4,551,338 | 11/1985 | Wallace | 99/532 |
| 4,739,699 | 4/1988 | Nelson et al. | 99/359 |
| 4,784,292 | 11/1988 | Johndrow et al. | 99/357 |
| 4,864,923 | 9/1989 | Langen | 99/533 |
| 5,029,520 | 7/1991 | Okada | 99/357 |

*Primary Examiner*—Timothy F. Simone
*Attorney, Agent, or Firm*—Dority & Manning

[57] ABSTRACT

A cooking apparatus receives a sealed container of food inside a cooking chamber. A controller operates a motor to drive a rack and pinion gear set to lower a nozzle to puncture the cover of the container. Limit switches position the nozzle at a predetermined location within the container. The controller activates solenoids which open steam and/or water valves to permit steam and/or water from a boiler to be introduced inside the food container through the nozzle to mix and complete cooking of the food contents of the container. The controller operates the motor to withdraw the nozzle from within the container and activates a solenoid of a steam valve to provide steam through a confinement cylinder that subjects the nozzle to a steam bath after the nozzle has been retracted from within the food container. A limit switch cooperates with the controller to prevent the nozzle from being withdrawn from the cooking chamber. Capacitive proximity level sensors permit the controller to identify the type of food product in the container disposed inside the cooking chamber. The controller selects a cooking procedure using the desired combination of steam and/or hot water according to the contents of the container. The controller can cause the steam to be pulsed intermittently into the container in bursts of steam of predetermined length. The controller can cause hot water to flow through the nozzle to wash down the inside of the cooking chamber at predetermined times.

13 Claims, 10 Drawing Sheets

AUTOMATED COOKING APPARATUS

BACKGROUND OF THE INVENTION

The present invention relates to apparatus and method for cooking and more particularly to automated apparatus and method for cooking prepackaged so-called fast foods.

OBJECTS AND SUMMARY OF THE INVENTION

It is a principal object of the present invention to provide an apparatus and method for cooking a food product stored in a container that is initially sealed without requiring the operator to manually unseal the container prior to initiating the operation of the apparatus.

It is another principal object of the present invention to provide an apparatus that automatically cooks the food stored in a container that is sealed upon being inserted into the apparatus and does not require the operator to unseal the container manually prior to activating the apparatus to perform the automatic cooking function.

It is also a principal object of the present invention to provide an apparatus capable of cooking food stored in a container that has been refrigerated prior to insertion into the apparatus in a sealed condition wherein the cooking is effected by the apparatus by the introduction of steam and/or hot water into the container to cook the food product with resulting product temperature and quality that is desirable while using only a very short cooking time.

It is yet another principal object of the present invention to provide an apparatus for automatically cooking food that is stored in a sealed container kept in a refrigerated space prior to placement into the apparatus wherein the implements of the apparatus contacting the food are automatically cleansed and sanitized by the apparatus after each cooking cycle.

It is yet another principal object of the present invention to provide an apparatus for automatically cooking food that is stored in a sealed container kept in a refrigerated space prior to placement into the apparatus wherein the immediate environment surrounding the food container is periodically and automatically cleansed and sanitized by the apparatus.

A further principal object of the present invention is to provide a cooking apparatus that automatically detects the type of food product to be cooked and selects the proper cooking sequence based upon the type of food product.

It is still another principal object of the present invention to provide a method that automatically cooks the food stored in a container that is sealed upon being inserted into the cooking apparatus and does not require the operator to unseal the container manually prior to cooking the food.

It is also a principal object of the present invention to provide a method capable of cooking food stored in a container that has been refrigerated prior to insertion into the cooking apparatus in a sealed condition wherein the cooking is effected by the apparatus by the introduction of steam and/or hot water into the container to cook the food product with resulting product temperature and quality that is desirable while using only a very short cooking time.

It is yet another principal object of the present invention to provide a method for automatically cooking food that is stored in a sealed container kept in a refrigerated space prior to placement into the cooking apparatus wherein the implements of the cooking apparatus contacting the food are automatically cleansed and sanitized by the apparatus after each cooking cycle and/or periodically.

It is yet another principal object of the present invention to provide a method for automatically cooking food that is stored in a sealed container kept in a refrigerated space prior to placement into the cooking apparatus wherein the immediate environment surrounding the container of the food is automatically and periodically cleansed and sanitized.

A further principal object of the present invention is to provide a cooking method that includes automatic detection of the type of food product to be cooked and automatic selection of the proper cooking sequence based upon the type of food product.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The present invention is configured and programmed to operate on a food storage container of the type having a cup with a sealed cover that yields to puncture. To achieve the objects and in accordance with the purpose of the cooking apparatus and method of the present invention, as embodied and broadly described herein, a means is provided for isolating the food storage container from the operator of the cooking apparatus during the cooking process. As embodied herein, the container isolating means can include a cooking chamber disposed inside a cabinet. The cup is placed inside the cooking chamber through a front door of the cabinet. The bottom wall of the cooking chamber is configured with a pair of opposed ledges that form a supporting surface to carry the cup and to preposition the cup where the other components of the apparatus can operate on it. In addition, the bottom wall is provided with a drainage channel configured and disposed beneath the ledges and having a drain opening. A switch detects the lowered condition of the door and generates a signal to indicate that the door is positioned to be engaged by a locking mechanism that secures the door in the lowered position. The door locking mechanism can include an electrically operated solenoid which can be extended to block vertical movement of the door's flange and thus prevent upward vertical movement of the door.

In further accordance with the present invention, a means is provided for introducing steam inside the food storage container. As embodied herein, the steam introducing means desirably can include one or more of a first elongated hollow shaft, a flexible hollow hose connected at one end to one end of the hollow shaft, an apertured nozzle connected to the opposite end of the first hollow shaft, an opening in the top wall of the cooking chamber, and a sealing gasket. The opening in the top wall of the cooking chamber is configured to allow passage of the first hollow shaft therethrough and to accommodate disposition of the sealing gasket therein.

The steam introducing means also can include a steam boiler having at least one steam take-off line connected in communication with the first hollow shaft via a flexible hose. The boiler's electric resistance heating element is provided with electricity via a high-temperature cut-off device that terminates the supply of electricity to the heating element whenever the temperature rises above a predetermined limit. A pressure sensor detects the pressure inside the boiler and provides this information to a pressure controller which is electrically connected to control the provision of electricity to the heating element via the high-temperature cut-off device. The boiler is supplied with make-up water via a solenoid actuated make-up water valve and a water filter which desirably has a filtering cartridge and communicates with the make-up valve via a manual shut-off valve and a check valve.

A high level of water inside the boiler is detected by a high level sensor which is electrically connected to a controller in the form of a microprocessor programmed to turn off the flow of electricity to the make-up water solenoid valve in response to a high water level signal from the high level sensor. Similarly, a low level of water inside the boiler can be detected by a low level sensor which is electrically connected to the controller, which is programmed to open the make-up water solenoid valve to permit additional make-up water to enter the boiler in order to raise the water level to the predetermined height inside the boiler necessary for normal operation of the boiler. However, the controller desirably operates the make-up water valve after every cooking cycle, and there is no need for the low boiler water level sensor. The boiler can be provided with an internal vacuum pressure relief valve that activates when the pressure inside the boiler gets below a level that has been predetermined to require relief of the negative pressure inside the boiler for safety reasons and to prevent the contents of the food storage container from being sucked into the nozzle during operation of the cooking cycle.

In further accordance with the present invention, the steam introducing means can include a first, solenoid actuated steam valve which is configured and disposed to regulate the flow of steam from the boiler to the openings of the nozzle.

In further accordance with the present invention, a means is provided for introducing hot water inside the food storage container received inside the container isolating means. As embodied herein, the hot water introducing means desirably includes the same components as the steam introducing means described above. However, the hot water introducing means includes a hot water take-off line with an inlet disposed closer to the bottom of the boiler than the inlet of the steam take-off line, which is disposed near the top of the boiler. Moreover, the hot water introducing means includes a separate solenoid actuated hot water valve that is configured and disposed to regulate the flow of hot water from the boiler to the openings of the nozzle.

In further accordance with the present invention, the steam introducing means can include a controller which is electrically connected to selectively actuate the solenoid to open and close the steam valve. Similarly, in further accordance with the present invention, the means for introducing hot water can include a controller which is electrically connected to selectively actuate the solenoid to open and close the hot water valve. In both cases, the controller can include a programmable microprocessor such as an EPROM (Erasable Programmable Read Only Memory chip).

The steam introducing means and/or the hot water introducing means can also include a means for selectively disposing the first hollow shaft in communication with the inside of the food storage container that is received inside the container isolating means. As embodied herein, the hollow shaft disposing means can include a rack gear which is rigidly connected to a portion of the first hollow shaft that remains outside of the cooking chamber. The hollow shaft disposing means also can include a rotatable pinion gear that is disposed to engage with the rack gear. The hollow shaft disposing means further can include an electric drive motor that has a rotatable shaft connected to rotate the pinion gear.

In further accordance with the present invention, the hollow shaft disposing means can include a means for vertically positioning the nozzle outlet openings at a predetermined height above the bottom wall of the cooking chamber. As embodied herein, the vertical positioning means for the nozzle outlet openings can include at least one limit switch that is electrically connected to the electric motor. The limit switch is disposed at a position so that it is engaged by the rack gear at the lower extreme limit of the desired travel by the rack gear. At this lower travel limit of the rack gear, the nozzle outlet openings will be appropriately disposed with respect to the bottom of the cup of the food storage container. Such disposition of the nozzle permits the desired mixing action within the viscous portion of the food stored in the food storage container when the steam and/or hot water is introduced through the outlet openings of the nozzle.

In further accordance with the present invention, the hollow shaft disposing means also can include a means for preventing a predetermined portion of the hollow shaft from leaving the confines of the container isolating means. As embodied herein, the hollow shaft restricting means can include at least a second limit switch electrically connected to the electric motor. The second electric limit switch is disposed so that it is engaged by the rack gear before any portion of the hollow shaft that is exposed to foodstuffs during the cooking process, leaves the confines of the cooking chamber. When the upper or second limit switch is activated, the motor that rotates the pinion gear is stopped. This prevents the first hollow shaft portion that is exposed to food during the cooking process, from moving past the opening and the gasket in the top wall of the cooking chamber. In so doing, a means is provided for maintaining sanitary conditions within the cooking chamber.

In further accordance with the present invention, a means is provided for identifying the contents of the food storage container without unsealing the container by the operator. One embodiment of the contents identifying means is a pair of capacitance proximity level sensors. One sensor is desirably disposed to detect the level of solids that would exist inside the container if the container held the 90/10 type product. The other sensor is desirably disposed to detect the level of solids that would exist inside a container holding a 50/50 product. Alternative embodiments of the contents identifying means would include a bar code scanner or a weight sensing mechanism.

In yet further accordance with the present invention, a means is provided for varying the cooking times and the relative proportions of water and steam introduced into the food storage container through the steam introducing means and/or the hot water introducing means.

As embodied herein, the cooking varying means can include one or more of the controller, the first steam solenoid valve, the hot water solenoid valve, and the contents identifying means. The information provided to the controller by the contents identifying means, can be used by the controller as the basis for selecting the automatic sequence of events necessary to operation of the apparatus to complete the cooking of the identified contents of the food storage container. The controller would be programmed to take account of both the necessary heat content to complete the cooking of the identified product as well as the necessary liquid needed to hydrate the final product as desired. The controller can be programmed to select the time when the first steam valve opens and the time when the first steam valve closes.

In yet further accordance with the present invention, a means is provided for determining whether the food storage container is properly oriented to enable the apparatus to perform the necessary operations to effect the cooking of the contents of the food storage container. Desirably, the container orientation checking means can include the same device which performs the contents identifying function described above.

In still further accordance with the present invention, a means is provided for automatically sanitizing at least a portion of the steam introducing means and/or hot water introducing means. Desirably, the portion to be sanitized is the portion that is positionable so as to come into contact with the food stored inside the container. As embodied herein, the automatic sanitizing means for the steam introducing means and/or hot water introducing means, includes a second elongated hollow shaft and a steam confinement cylinder at the end of the second shaft disposed inside of the cooking chamber. The second hollow shaft is provided with an opening into the space surrounded by the steam confinement cylinder. The second hollow shaft is oriented and configured to extend sufficiently into the cooking chamber so that the steam confinement cylinder is disposed in alignment beneath the opening in the top wall of the cooking chamber. The second hollow shaft is disposed at a height sufficiently above the bottom wall of the cooking chamber so as not to interfere with the disposition of a food storage container inside the cooking chamber. The steam confinement cylinder is configured and disposed to allow unimpeded travel of the nozzle and the first hollow shaft vertically up and down along the longitudinal axis of the steam confinement cylinder.

The means for automatically sanitizing the steam introducing means also can include a flexible hose connected to the end of the second hollow shaft that is opposite to the end connected to the steam confinement cylinder. In addition, the automatic sanitizing means also can include one or more of a second solenoid steam valve, the boiler, the steam take-off line, and the controller. The steam take-off line leads from the boiler to a steam manifold which is connected in communication with the inlet of the second steam solenoid valve. The controller initiates the opening of the second steam solenoid valve to coincide with the controller's operation of the drive motor to drive the rack gear vertically upwardly to begin retracting the nozzle and the first hollow shaft from within the food storage container. This showers steam into the area confined by the steam confinement cylinder. The first hollow shaft and the nozzle pass through this steam shower after they are extracted from the food storage container at the conclusion of the cooking process.

Since activation of the respective solenoid to open or close either the first or second steam valve (or the hot water valve), generates a magnetically induced current that could damage the microprocessor of the controller, a diode desirably is provided across the terminals of each solenoid valve to prevent the flow of any such current to the microprocessor.

In yet further accordance with the present invention, a means is provided for automatically sanitizing the container isolating means. As embodied herein, the automatic sanitizing means for the container isolating means can include one or more of the nozzle, the first hollow shaft, the flexible hose connected to the first hollow shaft, the common manifold, the hot water solenoid valve, the hot water take-off line, the boiler, a drainage channel, a drain opening, and the controller. The controller can be programmed so that the cooking chamber is periodically cleaned. This can be programmed to occur every 30 minutes. Alternatively, the period can be determined by the controller's monitoring of the occurrence of certain events. For example, the controller can be programmed to cause the cleansing of the cooking chamber to occur upon every 30 consecutive minutes of non-use of the cooking chamber. The non-use or dormancy of the cooking chamber can be determined by the information supplied to the controller by the container orientation checking means for example, if desired. In performing this periodic cleansing of the cooking chamber, the nozzle will be retracted to its maximum height position above the bottom wall of the cooking chamber. The controller then opens hot water solenoid valve to introduce hot water under pressure from the boiler through the outlet openings in the nozzle. Disposed at this position, the nozzle is configured to produce a pressurized spray of hot water directed to wash down all of the interior wall surfaces of the cooking chamber disposed beneath the maximum retraction height of the nozzle outlet openings. The wash water collects in the drainage channel, drains through the drain opening in the drainage channel, and into a drain hose which carries the wash water out of the apparatus and into a waste drain located on the premises where the apparatus is housed.

Electrical power is provided to the various components of the apparatus from a terminal block. A step-down transformer is electrically connected to provide electricity to a control board which includes an EPROM.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

Figure 13:
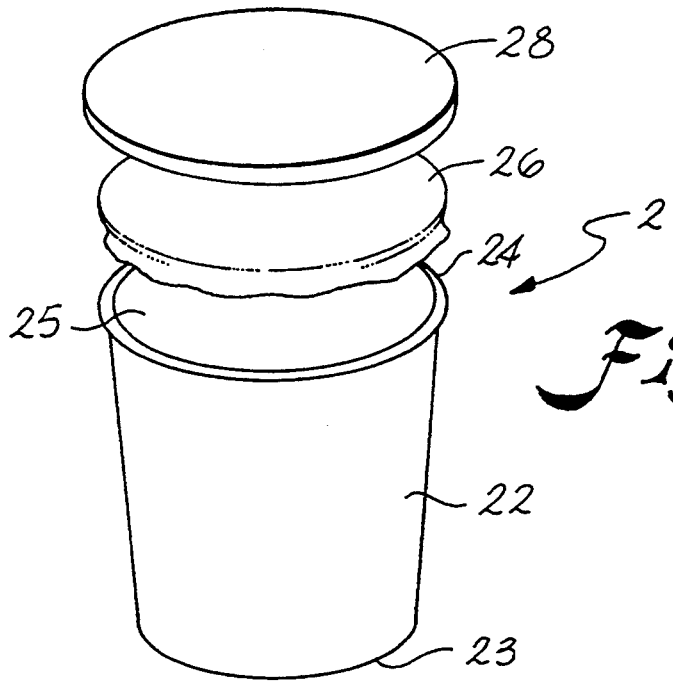
FIG. 13 illustrates an elevated perspective view of components of a food storage container designed to be used in conjunction with the apparatus and method of the present invention.

The embodiment of the present invention described below is configured and programmed to operate on a food storage container of the type indicated generally by the numeral 20 in FIG. 13 for example. Such container 20 has a body in the form of a cup 22 which desirably can be formed of styrofoam or coated paper. For example, the cup can be formed of laminated paper provided with a moisture resistant coating of material. Cup 22 typically has a flat bottom 23 and a lip 24, the latter being configured to surround the opening 25 of the cup. Such container 20 includes an air tight sealing layer 26 which desirably can be formed of coated paper or aluminum foil or a combination of paper and foil. The sealing layer must be strong enough to act as a cover which protects the foodstuffs inside the container from outside contaminants during normal handling and storage of the container at room temperature and in refrigerated compartments. However, the sealing cover 26 must yield to puncture at pressures greater than 200 psi. The sealing layer must adhere to the cup, yet must be removable by hand once the cooking is completed. Thus, an adhesive which weakens when heated, could be provided between the sealing layer 26 and the lip 24 of the cup 22. Such container 20 can be configured to receive a manually attachable and removable lid 28 which desirably can be formed of flexible plastic which interlocks with the lip 24 of the cup 22. The shape and size of the food storage container can be varied to accommodate different portions or different appearances or different contents.

Prior to use in the apparatus of the present invention, the food storage containers 20 desirably are kept in a refrigerator that maintains the contents of the food storage containers at a temperature of about 38° F. Different types of food can be provided in the food storage container. For example, one is a soup-type product that consists of 50% liquid and 50% solid when prepared and completely cooked. This soup-type product is referred to as a 50/50 product. A more viscous food product such as chili or stew also can be provided in a form that consists of 90% solid and 10% liquid when completely cooked and prepared and is referred to as a 90/10 product. Other types of products with different ratios of solids to liquids in the finished cooked product also can be provided, and the apparatus of the present invention can be programmed to prepare such products in a manner similar to that described below for the 50/50 product or the 90/10 product. For example, a Raman-type product and products consisting predominately of pastas also can be prepared using the apparatus of the present invention. Typically, the food stored in the food storage container already has been partially cooked prior to storage in such containers. For example, vegetable ingredients of soups may have been blanched prior to storage of the product in the food storage containers.

Figure 1:
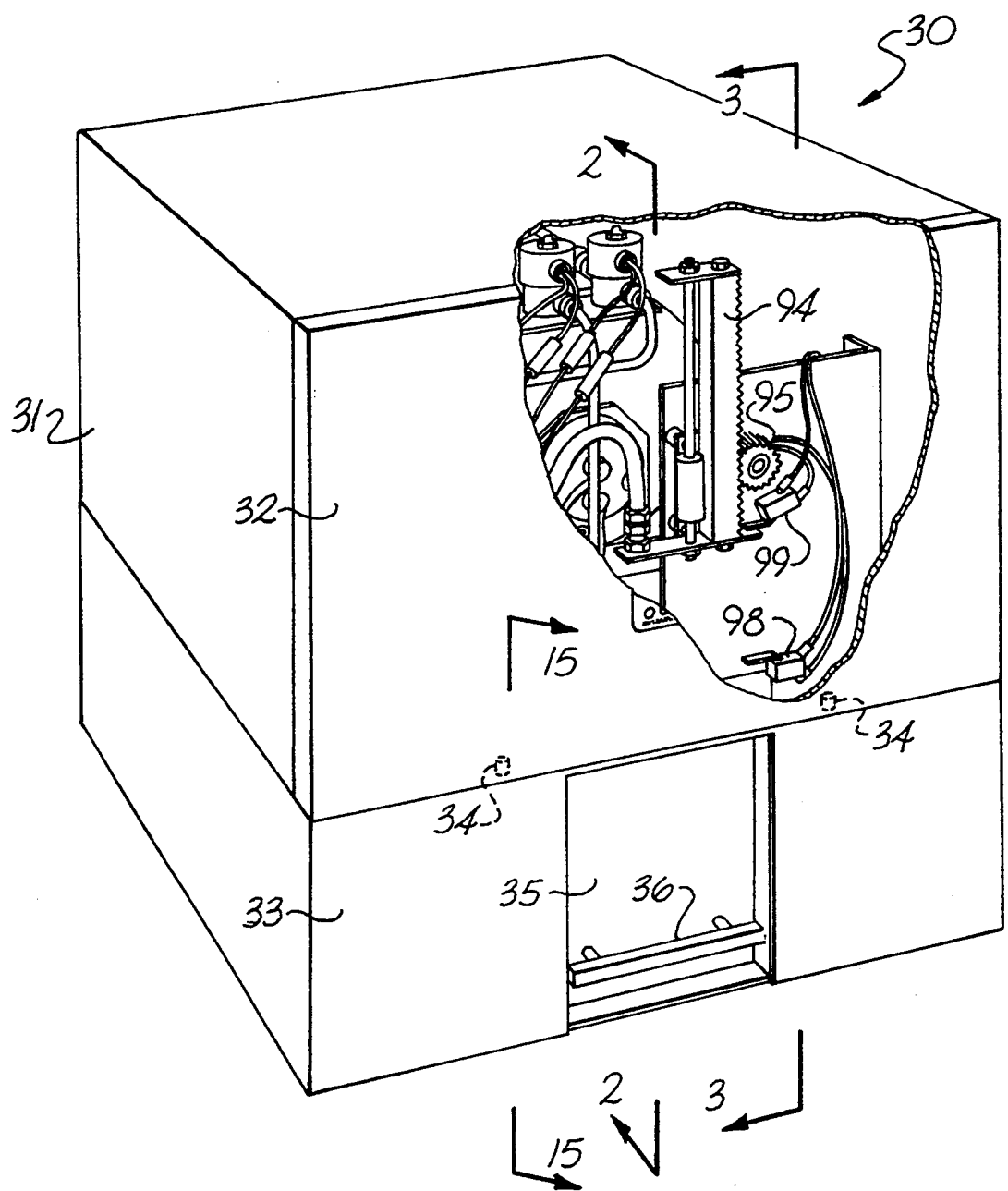
FIG. 1 illustrates an elevated perspective view of a preferred embodiment of the apparatus of the present invention with portions cut away.
Figure 3:
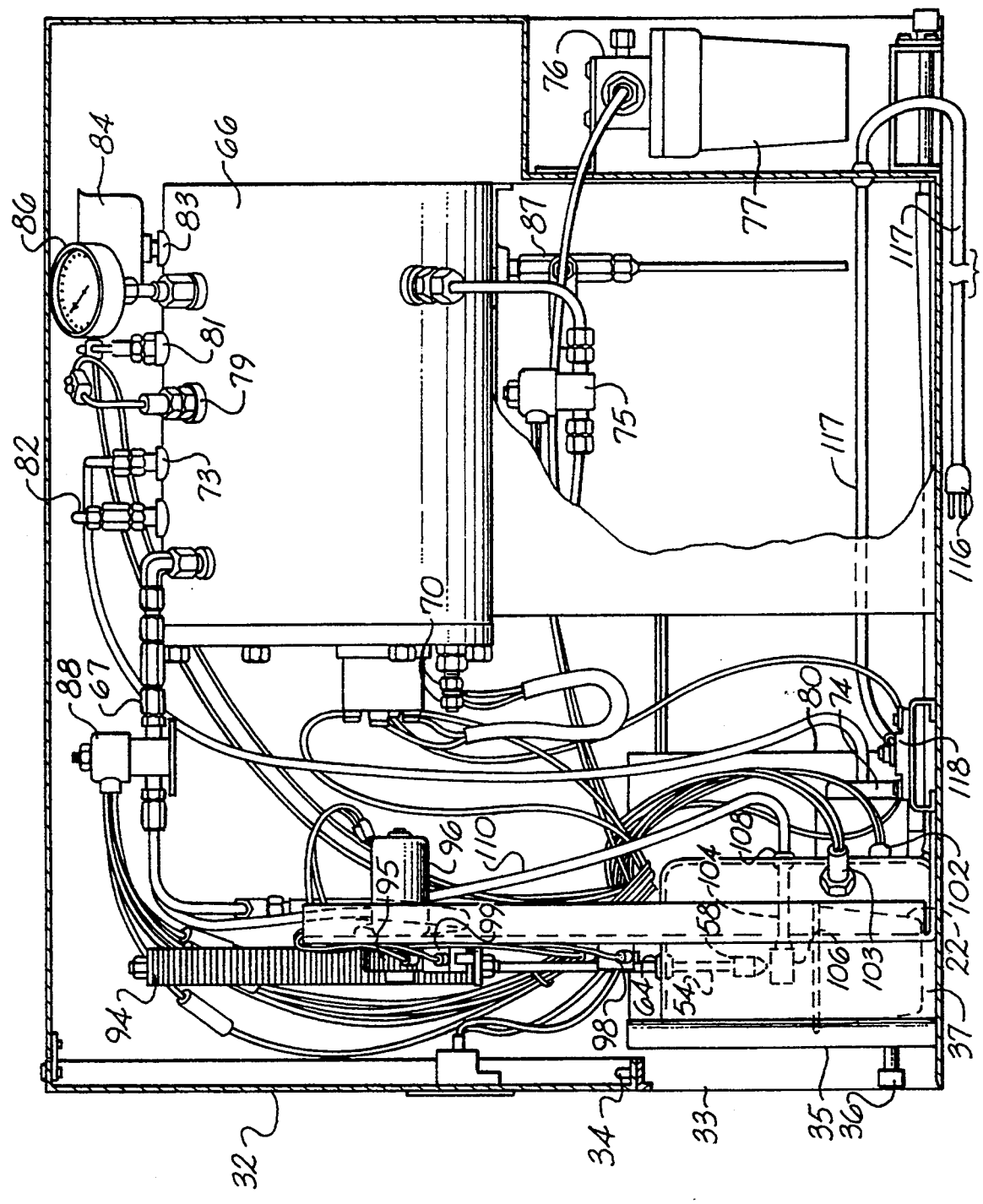
FIG. 3 illustrates a side plan view of the embodiment of FIG. 1 with the side of the cabinet removed and looking in the direction of arrows pointing to the numerals 3—3; with portions cut away.
Figure 15:
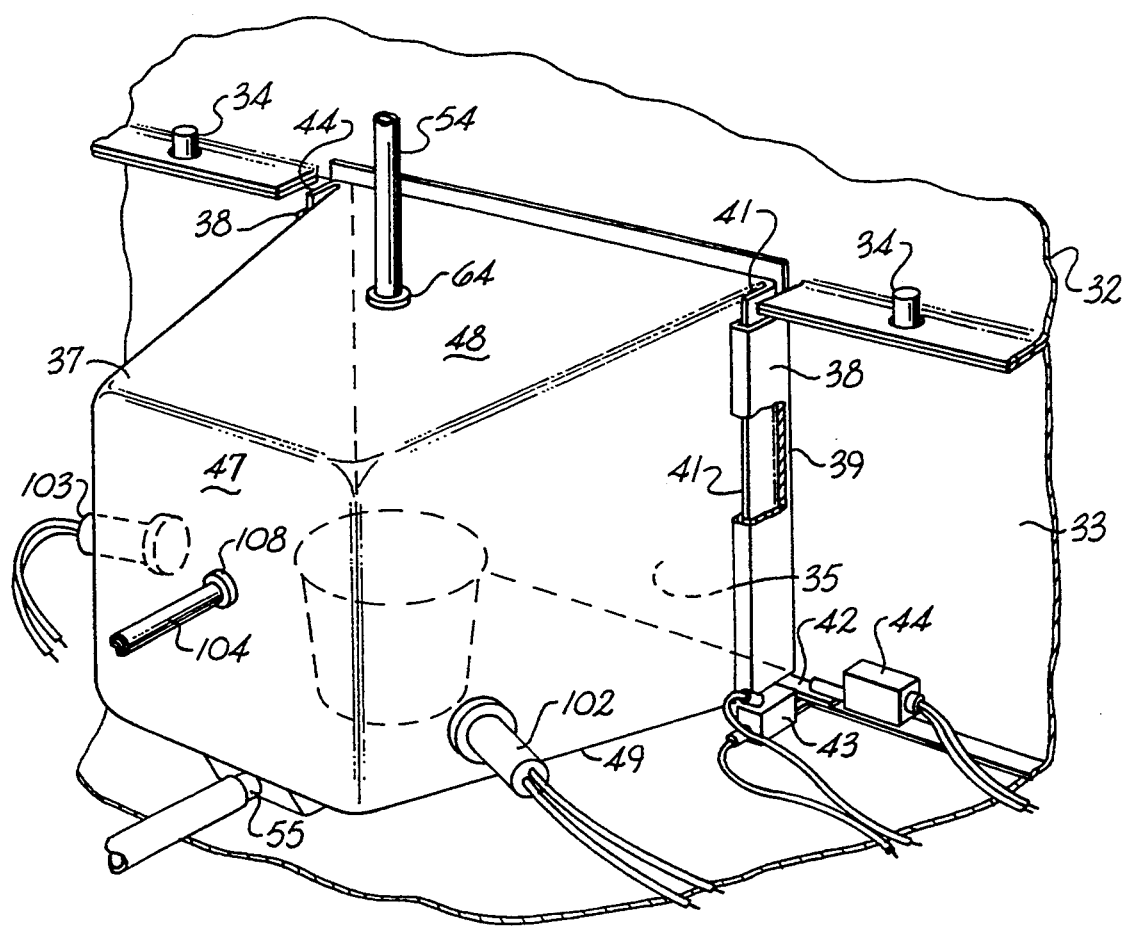
FIG. 15 illustrates an elevated perspective view looking in the direction toward the numerals 15—15 in FIG. 1 of components of a preferred embodiment of the apparatus of the present invention with portions shown in phantom (dashed line) and portions cut away.
Figure 16:
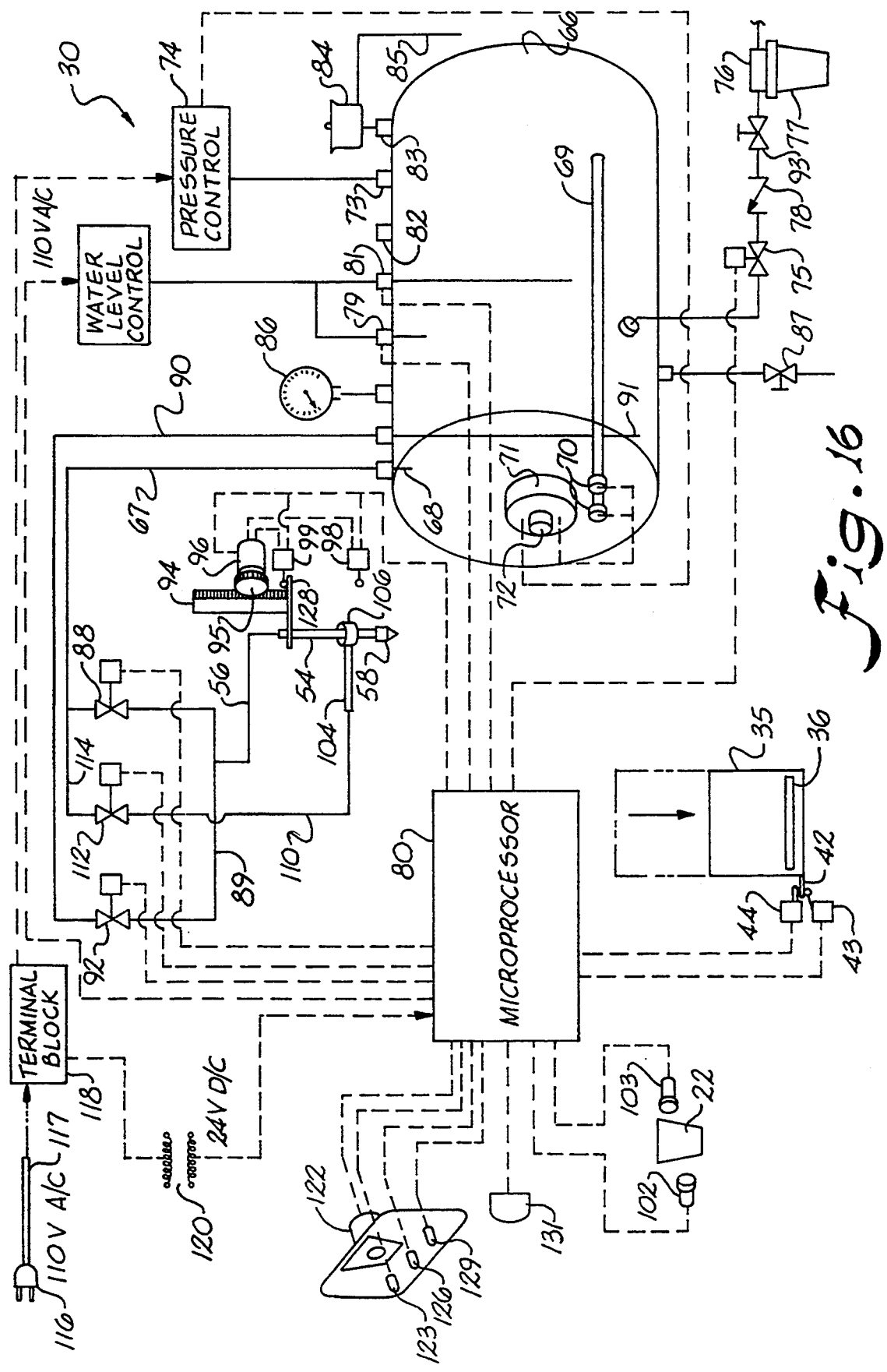
FIG. 16 schematically illustrates a preferred embodiment of the apparatus and method of the present invention.

A preferred embodiment of the automatic cooking apparatus of the present invention is shown in FIGS. 1 and 16 and is represented generally by the numeral 30. An exterior cabinet 31 desirably is formed of metal which is protected against rusting by a coating of paint which also is heat resistant. As shown in FIG. 1, the front of the cabinet faces the operator and is provided with an upper section 32 and a lower section 33. As shown in FIGS. 1, 3 and 15, the upper section 32 is connected to the lower section 33 by pins 34 and can be disengaged from the rest of the cabinet and pulled away from same to permit access inside the cabinet by technicians for purposes of repair and/or maintenance. In the lower section 33 of the front of the cabinet, a vertically sliding door 35 is provided with a handle 36 to enable the operator to raise and lower the door 35, which is shown in greater detail in FIGS. 3 and 15 and schematically in FIG. 16.

The door 35 provides access into a cooking chamber 37, which is shown in greater detail in FIGS. 2, 3, 4, 5, 6, 8, 10, and 15. As shown in FIG. 15, each side extrusion 38 of the door 35 is configured to slide up and down within a slot formed between the interior edges 39 of the lower section 33 of the front of the cabinet and the front edges 40 (FIG. 2) of the cooking chamber 37. As shown in FIG. 15, the side extrusions 38 of the door 35 engage the front side edges 41 of the cooking chamber 37. When the door is in the lowered position, the cooking chamber 37 is closed and a flange 42 extending from the base of the door and inside the cabinet, engages a switch 43. The switch 43 detects the lowered condition of the door and is schematically represented in FIG. 16. When the switch 43 is engaged by the door's flange 42, a signal is generated (and transmitted to a controller described below) to indicate that the door 35 is positioned so that a locking mechanism can be activated to secure the door in the lowered position. As shown in FIG. 15, the door locking mechanism includes an electrically operated solenoid 44 which can be extended to block vertical movement of the door's flange 42 and thus prevent upward vertical movement of the door 35. A schematic representation of the door locking mechanism is shown in FIG. 16.

Figure 4:
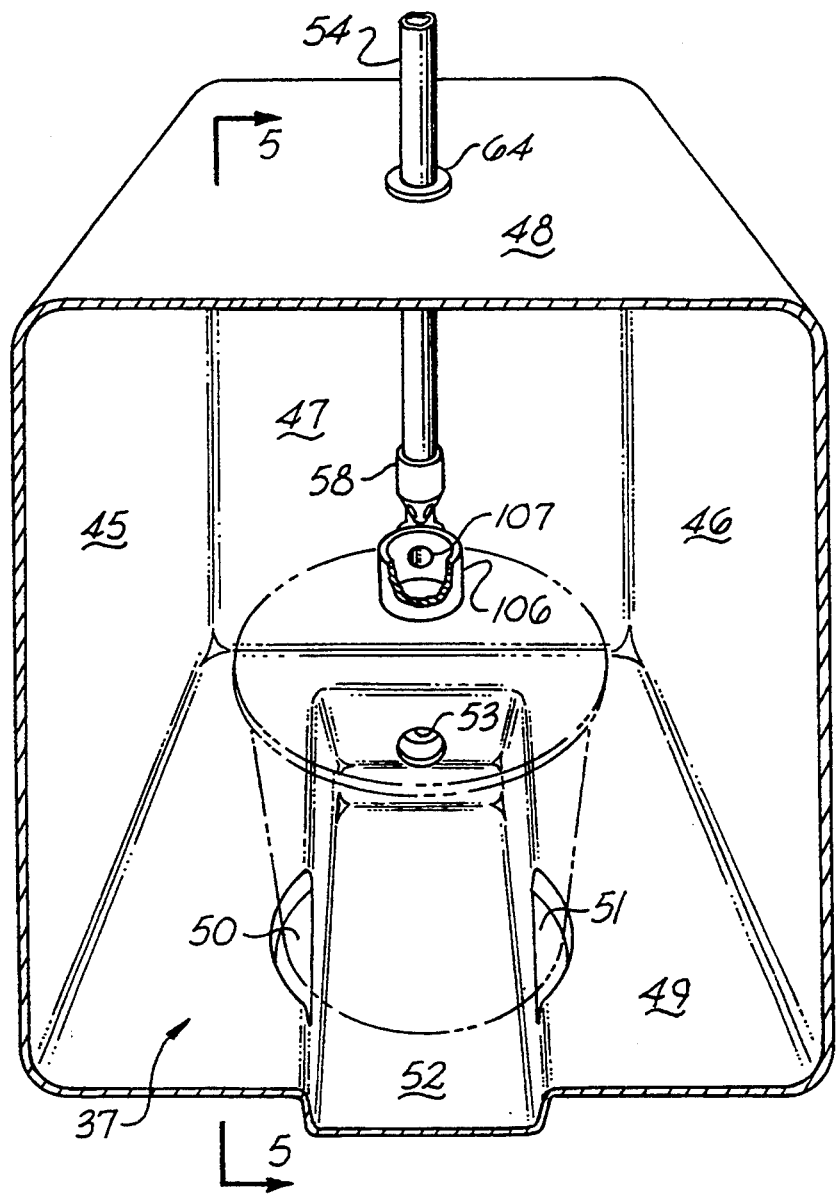
FIG. 4 illustrates an elevated perspective view of components of a preferred embodiment of the apparatus of the present invention with a food container shown in phantom (dashed line)

In accordance with the present invention, a means is provided for isolating the food storage container from the operator of the cooking apparatus during the cooking process. The container isolating means is configured to receive the food storage container and may be configured to completely surround the food storage container. As embodied herein, the container isolating means can include cooking chamber 37. As noted above, cooking chamber 37 includes door 35. As shown in FIG. 4 for example, the cooking chamber is further defined by a pair of side walls 45, 46 disposed generally opposite to each other, a back wall 47 disposed generally opposite to the entrance of the cooking chamber and to the door 35 whenever the door is in the lowered position, a top wall 48, and a bottom wall 49 disposed generally opposite to the top wall 48.

As shown in FIG. 4, the bottom wall 49 is configured with a pair of opposed ledges 50, 51 that are flat and disposed beneath the surrounding portion of the bottom wall 49. Together the ledges 50, 51 form a supporting surface of sufficient breadth to carry a container (shown in phantom) full of foodstuffs. The ledges are configured to receive a food storage container and to preposition the food storage container where the other components of the apparatus can operate on the food storage container in the desired manner (explained below). In addition, the bottom wall is provided with a drainage channel 52 configured and disposed beneath the ledges 50, 51. As shown in FIGS. 5, 6, 8, and 10 for example, at the lowest point of the drainage channel, a drain opening 53 is provided. One end of a drain hose 55 is connected to drain opening 53 and provides a conduit for removing liquid waste from the cooking chamber. The opposite end of drain hose 55 can be configured to be connected to a waste drain of the facility where the apparatus 30 is housed.

Figure 2:
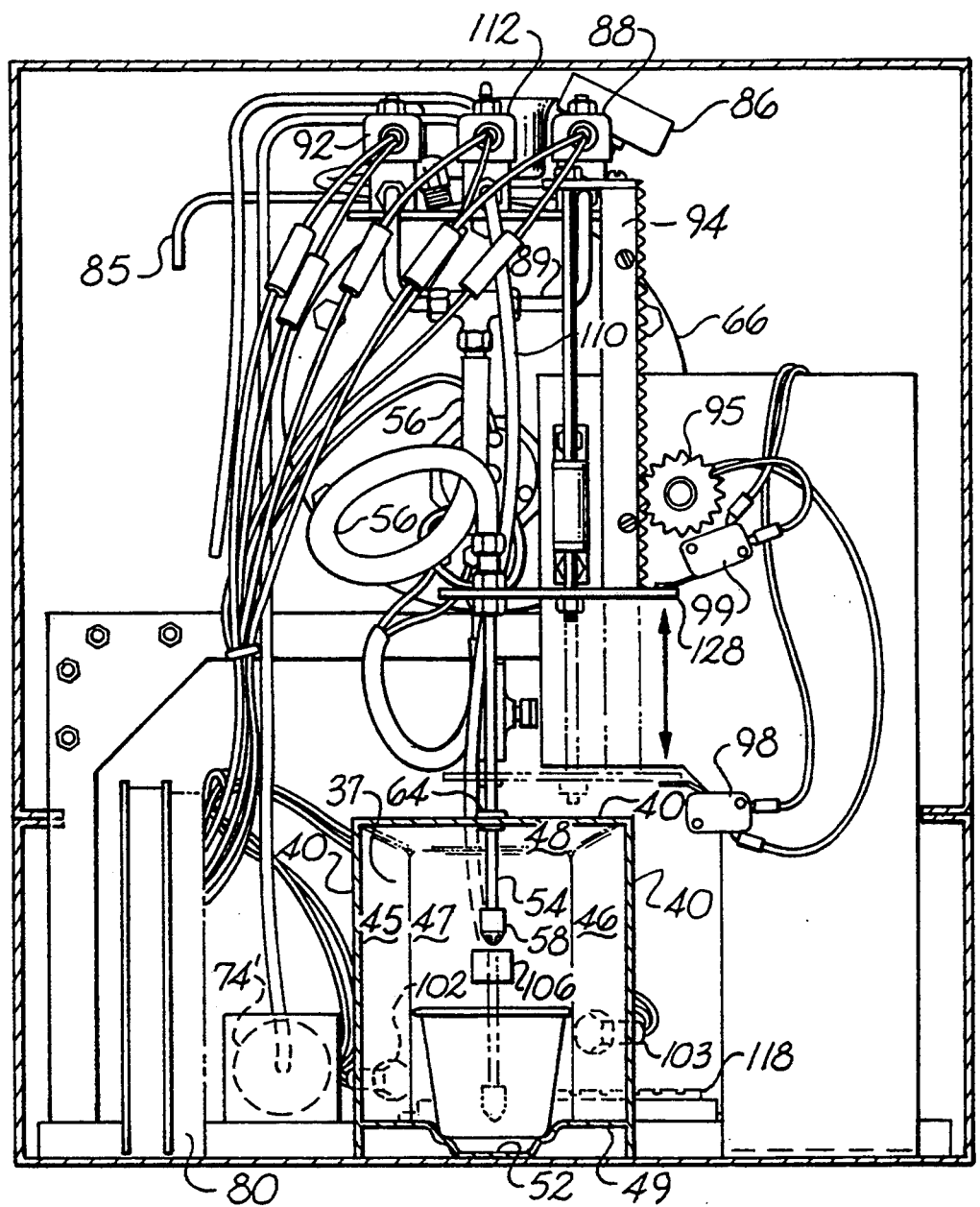
FIG. 2 illustrates a front plan view of the embodiment of FIG. 1 with the front of the cabinet removed and looking in the direction of arrows pointing to the numerals 2—2.

In further accordance with the present invention, a means is provided for introducing steam inside the food storage container. As embodied herein and shown in FIGS. 2-11 and 16, the steam introducing means desirably includes a probe in the form of a first elongated hollow shaft 54. A suitable probe 54 can have an outside diameter of 5/16 inches and an internal diameter of 0.243 inches. As shown in FIGS. 2 and 16, the steam introducing means further includes a flexible hollow hose 56 connected at one end to one end of hollow shaft 54. Hose 56 is rated to carry superheated steam and hot water without leakage. As shown in FIGS. 2-12 and 16, the steam introducing means also includes an apertured nozzle 58 connected to the opposite end of first hollow shaft 54.

Figures 11, 12:
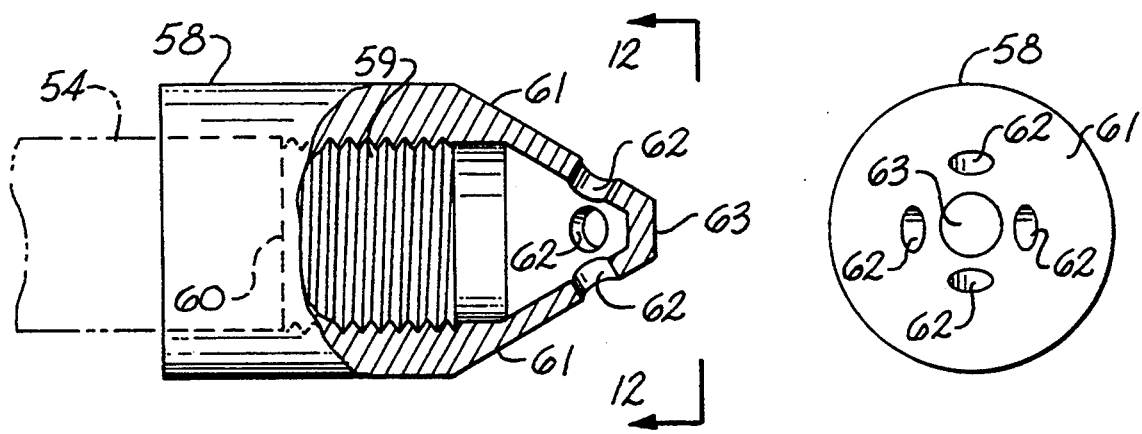
FIG. 11 illustrates components of a preferred embodiment of the apparatus of the present invention shown in cross-section and portions cut away.
FIG. 12 illustrates a component of a preferred embodiment of the apparatus of the present invention from a front plan view looking in the direction toward the numerals 12—12 in FIG. 11.

As shown in FIG. 11, nozzle 58 has a threaded interior 59 which engages a threaded end 60 of hollow shaft 54. As shown in FIGS. 11 and 12, nozzle 58 has a conical portion 61 which is provided with at least one aperture 62 or outlet opening 62 extending from the interior to the exterior of the nozzle. As shown in FIG. 12, four symmetrically spaced outlet openings 62 are disposed near a blunt tip 63 portion of nozzle 58. Nozzle outlet openings 62 are configured as circles and with diameters that provide a sufficient flow of hot water and steam at a pressure in the range of anticipated pressures to be supplied from the boiler 66 (described below) to introduce the desired amount of heat-carrying liquid necessary to complete cooking of the food product stored within the food storage container. Nozzle 58 and first hollow shaft 54 desirably are formed of metal or plastic which is capable of withstanding repeated temperature changes between room temperature and 250° F. over short periods of time without degradation. Brass or 304 stainless steel are suitable choices, and hard polymeric material such as nylon, acetal resins or the like may be suitable materials for forming nozzle 58 or first hollow shaft 54. However, to ensure a good threaded connection, it is desirable to form nozzle 58 from metal if shaft 54 is formed of plastic, and vice versa. In a preferred embodiment, nozzle 58 is formed of plastic material and is configured integral with an outer sleeve of tubular plastic that fits over and receives therein hollow shaft 54 formed of a metal such as stainless steel for structural rigidity. The plastic acts as heat insulation so that foodstuffs are less likely to bake onto the outside surface of the plastic nozzle 58 and sleeve surrounding shaft 54 than if the nozzle 58 and shaft 54 were metal and conducted the heat from the steam and hot water directly to their outside metal surfaces contacting the foodstuffs. In a further embodiment, a single plastic component includes nozzle 58 and hollow shaft 54, and this component can be seamless and eliminate the risk of leakage from a faulty connection between nozzle 58 and shaft 54.

In one suitable embodiment of nozzle 58, the tangent along the surface of conical portion 61 may be disposed at a 30 degree angle from the longitudinal centerline of nozzle 58. Outlet openings 62 may have diameters of about 0.063 inches. The diameter of blunt tip portion 63 may be about 0.093 inches. When the view of FIG. 12 is projected onto the plane of blunt tip portion 63, the centers of openings 62 may be at a radial distance of about 0.156 inches from the center of blunt tip portion 63, which is where the longitudinal centerline of nozzle 58 passes through.

The steam introducing means also includes a chamber access opening (not designated with a numeral) in top wall 48 of cooking chamber 37. The opening in the top wall of the cooking chamber is configured to allow passage of first hollow shaft 54 therethrough and to accommodate disposition of a sealing gasket 64 such as shown in FIGS. 2-6, 8, and 10. Sealing gasket 64 desirably is formed of a material which does not produce undue friction when in contact with the exterior surface of hollow shaft. A suitable embodiment of the sealing gasket 64 desirably may be formed of a Teflon material when hollow shaft 54 has a metal exterior surface or of metal when hollow shaft 54 has a plastic exterior surface. The interface between the interior opening surface of sealing gasket 64 and the exterior surface of hollow shaft 54 need not be air tight under pressures which may exist inside cooking chamber 37, it should be watertight under such pressures.

The steam introducing means also can include a steam boiler 66 having at least one steam take-off line 67 connected in communication with the first hollow shaft 54 and nozzle 58 via the flexible hose 56 as shown in FIGS. 3 and 16. As shown in FIG. 16, the inlet 68 to steam take-off line 67 is disposed near the top of the boiler 66. As schematically shown in FIG. 16, the boiler is heated by an electric resistance heating element 69 having external terminals 70 also shown in FIG. 3. In an alternative embodiment (not shown), the terminals could be sealed or internal terminals. As a safety precaution, heating element 69 is provided with electricity via a high-temperature cut-off device 71. High-temperature cut-off device 71 measures the temperature inside boiler and activates a switch that terminates the supply of electricity to heating element 69 whenever the temperature rises above a predetermined limit. When the switch cutting off the electricity to heating element 69 has been activated, a button 72 schematically shown in FIG. 16 pops out. The operator must manually depress the button 72 in order to allow electricity to be supplied to heating element 69.

As shown in FIGS. 3 and 16, a pressure sensor 73 senses the pressure inside boiler 66 and provides this information to a pressure controller 74 which is electrically connected to control the provision of electricity to heating element 69 via high-temperature cut-off device 71. Pressure controller 74 desirably is a pressure sensitive relay.

Boiler 66 is supplied with make-up water via a solenoid actuated make-up water valve 75 and a water filter 76 as shown in FIGS. 3 and 16. As shown in FIG. 16, water filter 76 desirably has a filtering cartridge 77 and communicates with make-up valve 75 via a check valve 78. Suitable embodiments of filtering cartridge 77 include a carbon cartridge or an ion exchange cartridge. As shown in FIG. 16, a manual shut-off valve 93 is disposed between check valve 78 and water filter 76 so that boiler 66 can be isolated manually from the water supply provided by the facility where the apparatus is located.

As shown in FIGS. 3 and 16, a high level sensor 79 is disposed within boiler 66 and detects the presence of a high level of water inside boiler 66. High level sensor 79 is electrically connected to a controller 80, which desirably includes a microprocessor that can be programmed to turn off the flow of electricity to the make-up water solenoid valve 75 in response to a high water level signal from high level sensor 79 inside boiler 66. Preferably, the controller is programmed so that after each cooking cycle, the controller opens the make-up water solenoid valve 75 to permit additional make-up water to enter boiler 66 in order to top off the water level inside boiler 66 to compensate for the water used during the previous cooking cycle. Alternatively, as shown in FIGS. 3 and 16, a low level sensor 81 can be disposed inside boiler 66 to detect a low level of water inside boiler 66. Low level sensor 81 is electrically connected to the controller which then would be programmed to open the make-up water solenoid valve 75 to permit additional make-up water to enter boiler 66 in order to raise the water level to the predetermined height inside boiler 66 necessary for normal operation of the boiler.

As shown in FIGS. 3 and 16, boiler 66 can be provided with an internal vacuum pressure relief valve 82 that activates when the pressure inside boiler 66 gets below a level that has been predetermined to require relief of the negative pressure inside the boiler for safety reasons and to prevent the contents of the food storage container 20 from being sucked into the nozzle 58 during operation of the cooking cycle. A second pressure relief valve 83 is provided with a cup 84 in which the released steam is condensed before being collected in the cup and drained via an overflow tube 85 shown in FIG. 2 for example. As shown in FIGS. 3 and 16, a manually actuated valve 87 is provided for draining boiler 66. As shown in FIGS. 2, 3, and 16, the boiler also can be provided with a visible pressure gauge 86 that indicates the pressure inside of boiler 66.

In further accordance with the present invention, the steam introducing means can include a first, solenoid actuated steam valve that is configured and disposed to regulate the flow of steam from the boiler to the openings of the nozzle. As shown in FIGS. 2 and 16, a first, solenoid actuated steam valve has an inlet connected in communication with steam take-off line 67 and an outlet connected to one branch of a common manifold 89. The outlet of the common manifold is connected to the end of the flexible hose 56 disposed opposite the end of the hose connected to first hollow shaft 54. Activation of the solenoid opens and closes the steam valve 88. Thus, the first, solenoid actuated steam valve 88 regulates the flow of steam from the boiler to the openings 62 of nozzle 58.

In further accordance with the present invention, a means is provided for introducing hot water inside the food storage container received inside the container isolating means. As embodied herein, the hot water introducing means desirably includes the same components as the steam introducing means described above. However, as shown in FIG. 16, the hot water introducing means includes a hot water take-off line 90 with an inlet 91 disposed closer to the bottom of the boiler 66 than the inlet 68 of the steam take-off line 67, which is disposed near the top of the boiler. Moreover, as also shown in FIGS. 2 and 16, the hot water introducing means includes a separate solenoid actuated hot water valve 92 that has its inlet connected to the outlet of hot water take-off line 90. As shown in FIGS. 2 and 16, the outlet of the hot water solenoid valve 92 is connected to the other inlet of common manifold 89. The outlet of the common manifold is connected to the end of the flexible hose 56 disposed opposite the end of the hose connected to first hollow shaft 54. Thus, the solenoid actuated hot water valve 92 regulates the flow of hot water from the boiler 66 to the openings 62 of nozzle 58.

In further accordance with the present invention, the means for introducing steam can include a controller 80 which is electrically connected to selectively actuate the solenoid to open and close the steam valve 88. Similarly, in further accordance with the present invention, the means for introducing hot water can include controller 80 which is electrically connected to selectively actuate the solenoid to open and close the hot water valve 92. In both cases, controller 80 can include a programmable microprocessor such as an EPROM (Erasable Programmable Read Only Memory chip).

The steam introducing means and/or the hot water introducing means can also include a means for selectively disposing the first hollow shaft in communication with the inside of the food storage container that is received inside the container isolating means. As shown in FIGS. 1–3 and 16, the hollow shaft disposing means can include a rack gear 94 which is rigidly connected to a portion of the first hollow shaft 54 that remains outside of the cooking chamber. The hollow shaft disposing means also can include a rotatable pinion gear 95 that is disposed to engage with the rack gear 94 to form a rack and pinion gear set. The hollow shaft disposing means further can include an electric drive motor 96 that has a rotatable shaft connected to rotate the pinion gear 95. A stepper motor may be used as drive motor 96, if desired, but a less expensive type of motor will suffice for drive motor 96.

Figure 6:
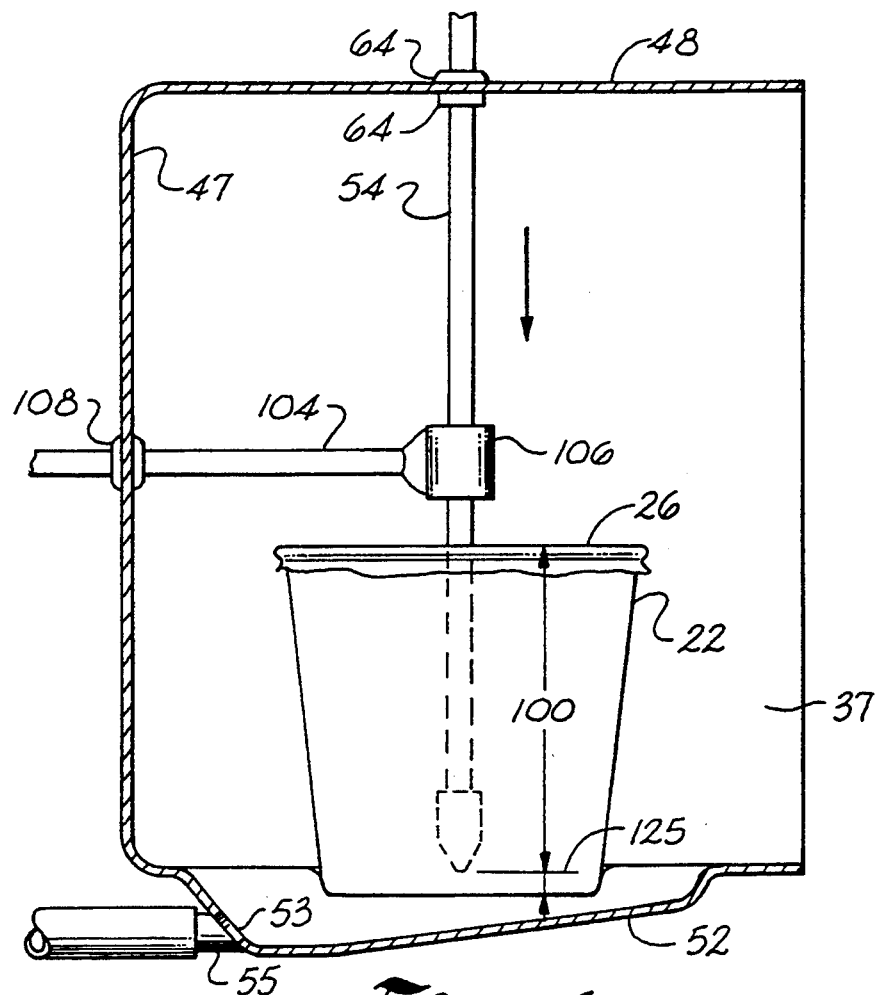
FIG. 6 illustrates an operative condition of components of a preferred embodiment of the apparatus and method of the present invention.
Figure 7:
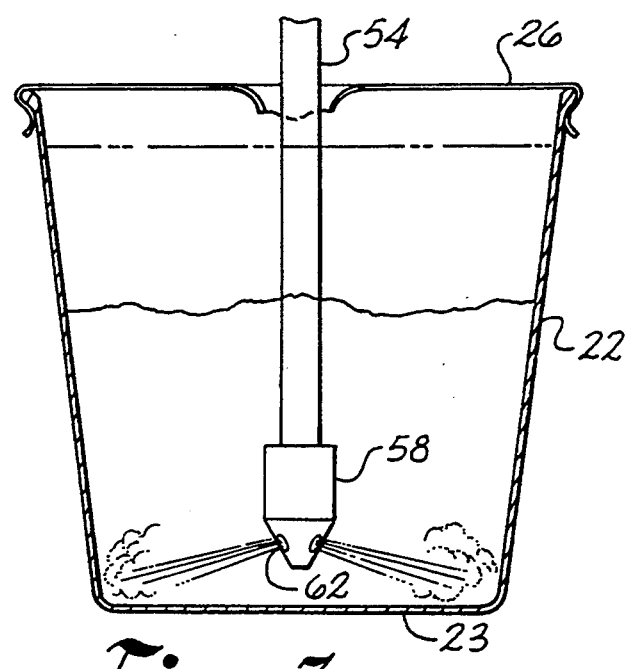
FIG. 7 illustrates an operative condition of components of a preferred embodiment of the apparatus and method of the present invention.

In further accordance with the present invention, the hollow shaft disposing means can include a means for vertically positioning the nozzle outlet openings at a predetermined height above the bottom wall of the cooking chamber. As shown in FIGS. 1, 2, 3, and 16, the vertical positioning means for the nozzle outlet openings 62 can include at least one limit switch 98 that is electrically connected to the electric motor 96. The limit switch 98 is disposed at a position so that it is engaged by the rack gear 94 at the lower extreme limit of the desired travel by the rack gear. At this lower travel limit of the rack gear, the nozzle outlet openings 62 will be disposed as shown in FIGS. 6 and 7 with respect to the bottom 23 of the cup 22 of the food storage container. As shown in FIG. 6, the nozzle is configured so that the surface forming the blunt end 63 of the nozzle 58 is disposed about one-quarter inch above the bottom 23 of the cup portion of the food storage container. Such disposition of the nozzle 58 configured as shown in FIGS. 11 and 12, permits the desired mixing action within the viscous portion of the food stored in the food storage container when the steam and/or hot water is introduced through the outlet openings 62 of the nozzle 58. The introduction of steam with the outlet openings of the nozzle at this height relative to the bottom of the cup provides the desired agitation and mixing of the food substance that is necessary to assure proper heating of the entire contents of the cup.

In further accordance with the present invention, the hollow shaft disposing means also can include a means for preventing a predetermined portion of the hollow shaft from leaving the confines of the container isolating means. As embodied herein and shown in FIGS. 1–3 and 16 for example, the hollow shaft restricting means can include at least a second limit switch 99 electrically connected to the electric motor 96. The second electric limit switch 99 is disposed so that it is engaged by the rack gear before any portion of the hollow shaft that is exposed to foodstuffs during the cooking process, leaves the confines of the cooking chamber. When the upper or second limit switch 99 is activated, the motor 96 that rotates the pinion gear 95 is stopped, thus preventing further vertical travel of the hollow shaft 54. In this way, the first hollow shaft portion that is exposed to food during the cooking process, never moves past the opening and gasket 64 in the top wall 48 of the cooking chamber. This provides a means for maintaining sanitary conditions within the cooking chamber, since the so-called "cooking portion" of the first hollow shaft 54 is never exposed to the working environment of the apparatus that exists outside the cooking chamber and beyond the confines of the gasket 64 which seals the opening in the upper wall 48 of the cooking chamber.

Figure 5:
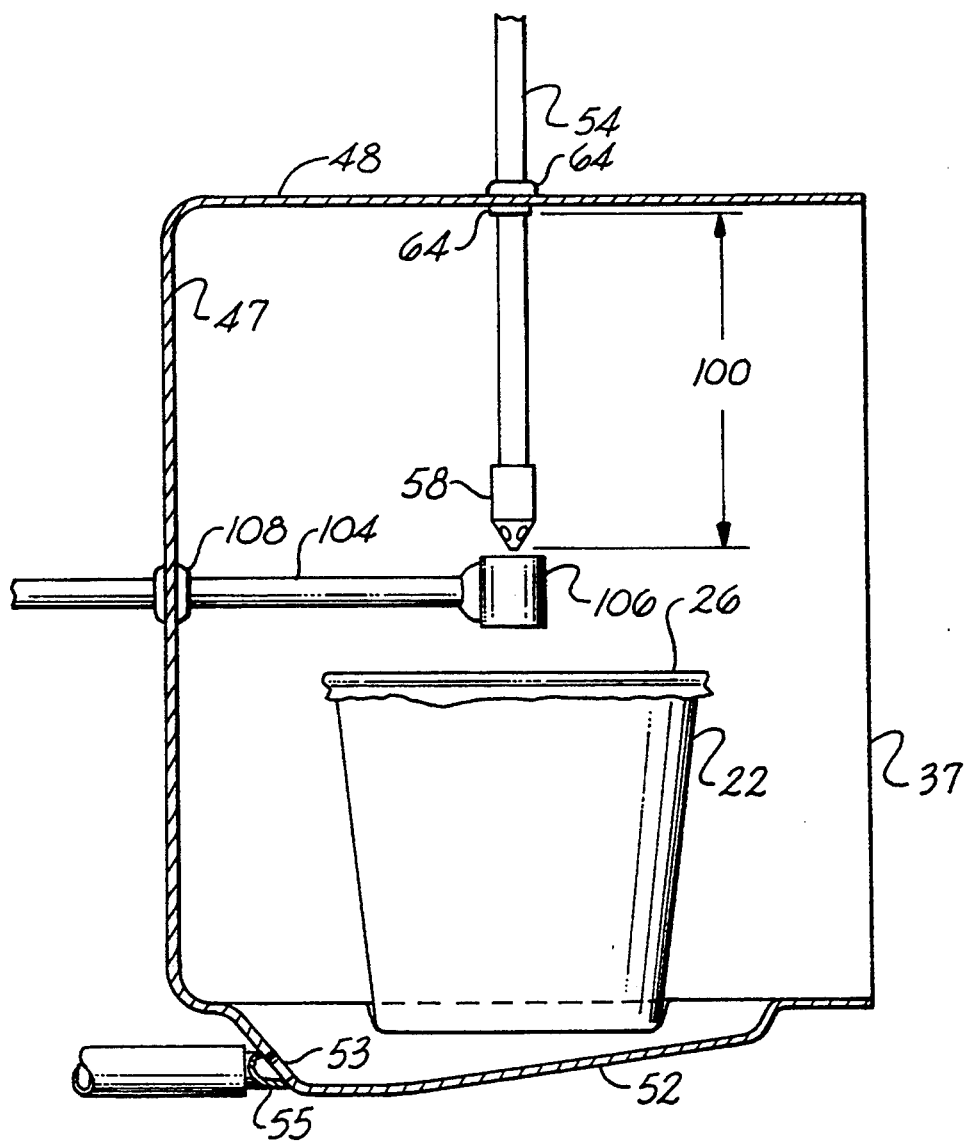
FIG. 5 illustrates a cross-sectional view looking in the direction toward the numerals 5—5 in FIG. 4.

As shown in FIGS. 5 and 6, the so-called "cooking portion" of the hollow shaft 54 and nozzle 58 is indicated by the double arrowed vertical line designated by the numeral 100.

Instead of limit switches 98, 99 that are tripped by mechanical engagement with the traveling rack gear 94, other types of positioners could be installed such as rheostats which provide differing voltage signals to controller 80 wherein the signals provide information to the controller that enable the controller to operate the motor accordingly.

In further accordance with the present invention, a means is provided for identifying the contents of the food storage container without unsealing the container by the operator. One embodiment of the contents identifying means is a pair of capacitance proximity level sensors 102, 103. Desirably, each capacitance proximity level sensor is disposed as shown in FIGS. 2, 3, and 15 at different locations adjacent the exterior of the cooking chamber. As shown in FIGS. 2, 3, and 15, one sensor 103 is disposed at a relatively higher elevation with respect to the bottom wall 49 of the cooking chamber 37. This sensor 103 is disposed to detect the level of solids that would exist if the container held the 90/10 type product. The other sensor 102 is disposed at a relatively lower level with respect to the bottom wall 49 of the cooking chamber 37. This other sensor 102 is disposed to detect the level of solids that would exist in a 50/50 product. The radial positioning of the two capacitance proximity sensors prevents operation of one sensor from interfering with the operation of the other sensor.

Alternative embodiments of the contents identifying means also can be provided instead of the two capacitance level sensors described above. For example, if it is anticipated that the exterior surface of the food storage container will be provided with a universal bar code with product identifying information, then the apparatus of the present invention can be provided with a bar code scanner configured and disposed to read the bar code displayed on the exterior surface of the food preparation container whenever the container is properly positioned on ledges 50, 51 to enable the apparatus to operate on the container in the desired manner. Another alternative embodiment of the contents identifying means could include a weight sensing mechanism that is configured and disposed to detect the weight of the food preparation container as the container is similarly properly positioned on the ledges formed in the bottom wall 49 of the cooking chamber.

In yet further accordance with the present invention, a means is provided for varying the cooking times and the relative proportions of water and steam introduced into the food storage container through the steam introducing means and/or the hot water introducing means. As shown in FIG. 16, the cooking varying means can include controller 80, first steam solenoid valve 88, hot water solenoid valve 92, and the contents identifying means. The information provided to controller 80 by the contents identifying means, is used by controller 80 as the basis for selecting the automatic sequence of events necessary for operating the apparatus to complete the cooking of the identified contents of the food storage container. Controller 80 would be programmed to take account of both the necessary heat content to complete the cooking of the identified product as well as the necessary liquid needed to hydrate the final product as desired. Controller 80 selects the time when first steam valve 88 opens and the time when first steam valve 88 closes, and therefore the length of time during which the first steam valve is to remain open while nozzle 58 is disposed inside of food storage container 20. This time element determines how much steam will be introduced into the food storage container to complete the cooking of the food product stored in the container. For example, in cooking a 90/10 product, the controller would open only the first steam solenoid valve 88 for a sufficient time to provide sufficient liquid to mix and heat the solid portion of the food stored in the container. This would be about one fluid ounce of condensed steam. Moreover, for a 90/10 product, controller 80 desirably would be programmed to turn the first steam valve on and off in 4 repeated cycles with each cycle consisting of 12 seconds of steam followed by 3 seconds without steam. This has the effect of producing a pulsing effect, which has advantages explained below in connection with the description of the operation of the apparatus and method of the present invention.

Similarly, depending on the information supplied to controller 80 by the contents identifying means, controller 80 determines whether to open hot water valve 92 at all during the cooking sequence. If the hot water valve is to be opened, controller 80 selects the time when hot water valve 92 opens relative to the time when the first steam valve 88 is opened or closed. If the controller opens the hot water valve, the controller selects the time when hot water valve 92 closes, and therefore the length of time during which the hot water valve is to remain open while nozzle 58 is disposed inside of food storage container 20. For example, if a 50/50 product were detected inside the cooking chamber 37 by the contents identifying means, controller 80 would operate the hot water valve to allow about four ounces of hot water from the boiler to be introduced into the container through the outlet openings 62 of nozzle 58. When the desired amount of hot water had been introduced, controller 80 begins operating first steam solenoid valve 88 for a predetermined length of time and begins operating drive motor 96 to raise rack gear 94 so that nozzle 58 begins ascending toward the lip 24 of the cup 22. By the time nozzle 58 is ready to leave the cup, sufficient liquid (in the form of hot water and condensed steam) would be introduced to yield the desired completely cooked and mixed product.

In yet further accordance with the present invention, a means is provided for determining whether the food storage container is properly oriented to enable the apparatus to perform the necessary operations to effect the cooking of the contents of the food storage container. Desirably, the container orientation checking means can include the same device which performs the contents identifying function described above. Accordingly, one embodiment of the container orientation checking means is a pair of capacitance proximity level sensors 102, 103. An alternative embodiment of the container orientation checking means can include a bar code scanner configured and disposed to read the bar code displayed on the exterior surface of the food preparation container whenever the container is properly positioned on ledges 50, 51 to enable the apparatus to operate on the container in the desired manner. Another alternative embodiment of the contents identifying means could include a weight sensing mechanism that is configured and disposed to detect the weight of the food preparation container as the container is similarly properly positioned on the ledges.

Figure 8:
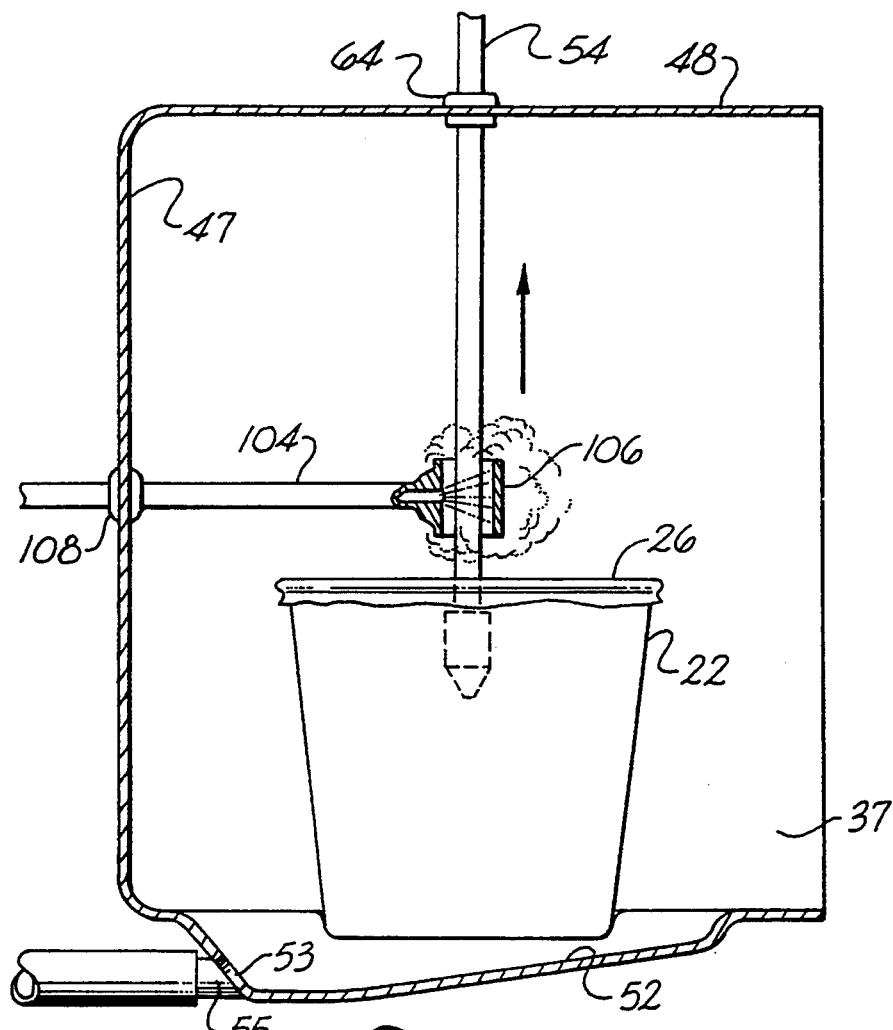
FIG. 8 illustrates an operative condition of components of a preferred embodiment of the apparatus and method of the present invention.
Figure 9:
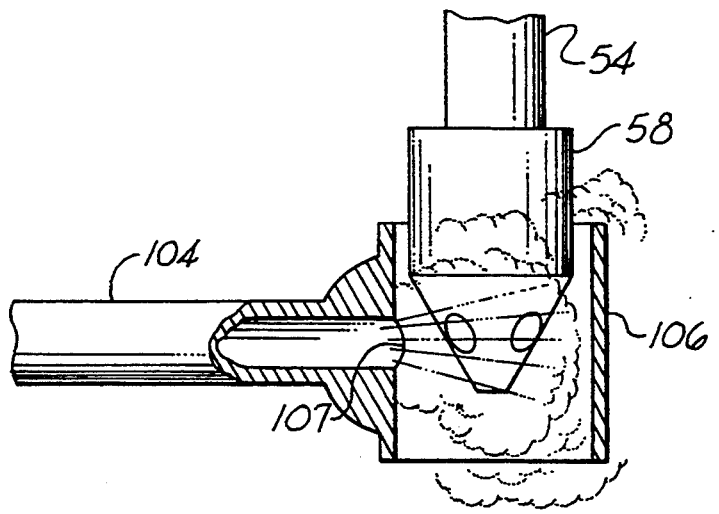
FIG. 9 illustrates an operative condition of components of a preferred embodiment of the apparatus and method of the present invention.

In still further accordance with the present invention, a means is provided for automatically sanitizing at least a portion of the steam introducing means and/or hot water introducing means. Desirably, the portion to be sanitized is the portion that is positionable so as to come into contact with the food stored inside the container. As shown in FIGS. 3, 5-6, 8-10, 15 and 16, the automatic sanitizing means for the steam introducing means and/or hot water introducing means, includes a second elongated hollow shaft 104 and a steam confinement cylinder 106. As shown in FIGS. 2-6, 8-10 and 16, steam confinement cylinder 106 is provided at the end of the second shaft 104 disposed inside of the cooking chamber. As shown in FIGS. 4 and 9 for example, second hollow shaft 104 is provided with an opening 107 into the space surrounded by steam confinement cylinder 106. Second hollow shaft 104 extends into the cooking chamber 37 via an opening (not visible) sealed by a sealing gasket 108 similar to the one used for the opening in the top wall 48 of the cooking chamber 37. As shown in FIGS. 2-6, 8 and 10, second hollow shaft 104 is oriented and configured to extend sufficiently into the cooking chamber so that steam confinement cylinder 106 is disposed in alignment beneath the opening in the top wall of the cooking chamber. Second hollow shaft 104 is disposed at a height sufficiently above the bottom wall 49 of the cooking chamber so as not to interfere with the disposition of a food storage container inside the cooking chamber. Steam confinement cylinder 106 is configured and disposed to allow unimpeded travel of nozzle 58 and first hollow shaft 54 vertically up and down along the longitudinal axis of steam confinement cylinder 106 as shown in FIGS. 5, 6, and 8 for example.

As shown in FIGS. 2, 3, and 16, the means for automatically sanitizing the steam introducing means also includes a flexible hose 110 connected to the end of the second hollow shaft 104 that is opposite to the end connected to the steam confinement cylinder 106. In addition to the flexible hose 110, the automatic sanitizing means also can include a second solenoid steam valve 112, boiler 66, steam take-off line 67, and controller 80. As schematically shown in FIG. 16, the steam take-off line 67 leads from the boiler to a steam manifold 114 which is connected in communication with the inlet of second steam solenoid valve 112. The controller selectively activates the solenoid of second steam valve 112 to open second steam valve 112 to provide cleansing steam from the boiler to the opening 107 at the end of second hollow shaft 104 connected in communication with steam confinement cylinder 106. This showers steam into the area confined by steam confinement cylinder 106. The first hollow shaft and nozzle 58 pass through this steam shower during extraction of nozzle 58 and first hollow shaft 54 from the food storage container at the conclusion of the cooking process. Controller 80 initiates the opening of second steam solenoid valve 112 in conjunction with operation of drive motor 96 to drive rack gear 94 vertically upwardly to begin retracting nozzle 58 and first hollow shaft 54 from within the food storage container 20.

Since activation of the respective solenoid to open or close either the first or second steam valve (or the hot water valve), generates a magnetically induced current that could damage the microprocessor of controller 80, desirably a diode (not shown) is provided across the terminals of each solenoid valve to prevent flow of any such current to the microprocessor.

Figure 10:
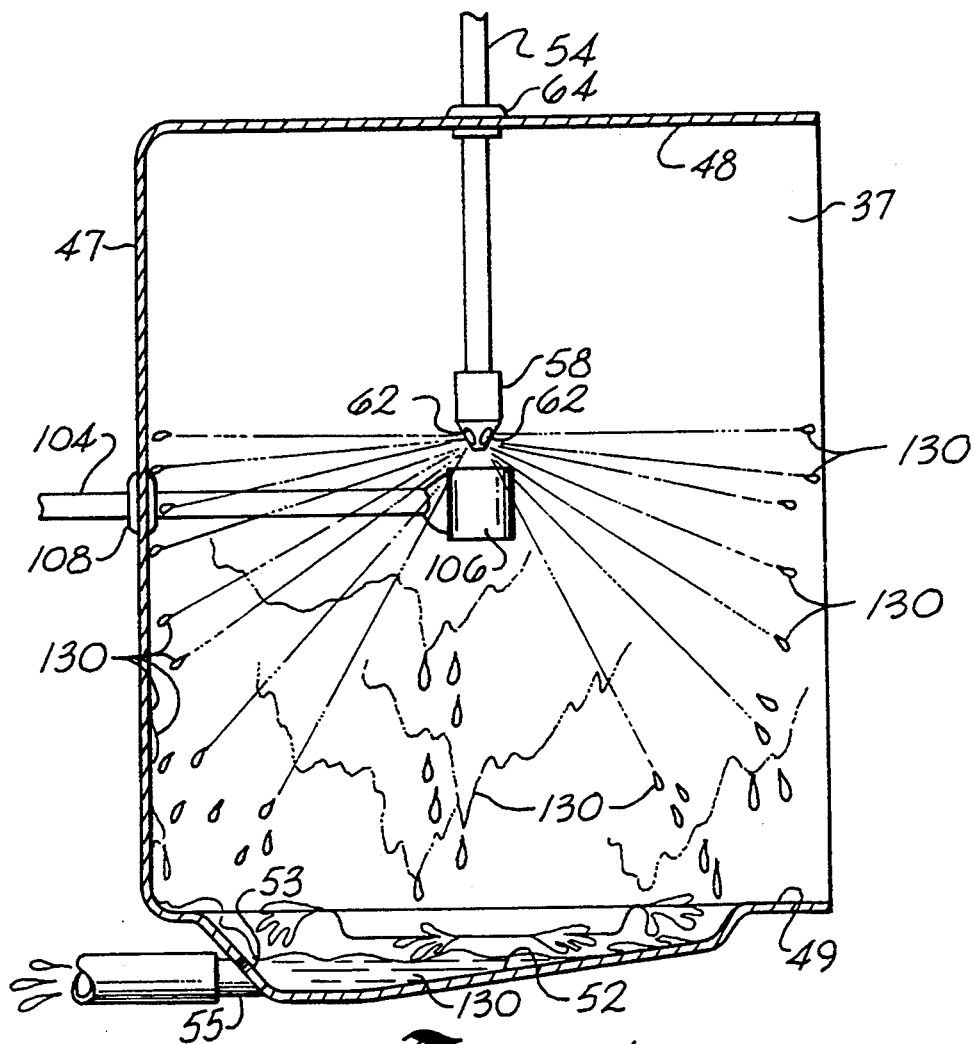
FIG. 10 illustrates a cross-sectional view similar to FIG. 5 but at a different operational condition of components of the present invention.

In yet further accordance with the present invention, a means is provided for automatically sanitizing the container isolating means. As shown in FIGS. 2, 3, 10, and 16 for example, the automatic sanitizing means for the container isolating means includes one or more of nozzle 58, first shaft 54, hose 56, common manifold 89, hot water solenoid valve 92, hot water take-off line 90, boiler 66, drainage channel 52, drain opening 53, and controller 80. The controller can be programmed so that the cooking chamber 37 is periodically cleaned. This can be programmed to occur every 30 minutes. The period can be determined by the controller. However, it also is possible to program the cleansing of the cooking chamber to occur upon every 30 consecutive minutes of non use of the cooking chamber. The non-use or dormancy of the cooking chamber can be determined by the information supplied to the controller by the container orientation checking means for example, if desired. In performing a periodic cleansing of cooking chamber 37, nozzle 58 will be retracted to its maximum height position above the bottom wall 49 of the cooking chamber 37. Controller 80 then opens hot water solenoid valve 92 to introduce hot water under pressure from the boiler 66 through the outlet openings 62 in nozzle 58 as shown in FIG. 10. Disposed at this position, the nozzle is configured to produce a pressurized spray of hot water directed to wash down all of the interior wall surfaces of the cooking chamber disposed beneath the maximum retraction height of the nozzle outlet openings 62. The wash water collects in the drainage channel 52, drains through the drain opening 53 as shown in FIG. 10, and into drain hose 55 which carries the wash water out of the unit 30 and into a waste drain located on the premises where the unit 30 is housed.

As shown in FIGS. 3 and 16, electric power is provided to the apparatus 30 via a conventional electric plug 116 and electrical power cord 117 which brings electric power to a terminal block 118 disposed inside cabinet 31. As shown in FIG. 16, electrical power is provided to the various components of the apparatus from terminal block 118. In the disclosed embodiment, the electrical power supply is standard 110 volt 60 cycle alternating current, which is supplied to pressure control 74 and a step-down transformer 120. The step-down transformer is electrically connected to provide 24 volts AC to a control board 80 which includes an EPROM. As schematically shown by the dashed lines in FIG. 16, the control board provides electrical power to operate the water level sensors 79, 81, the electric drive motor 96, the capacitance proximity level sensors 102, 103, and the solenoids of the door locking mechanism 44, the steam valves 88, 112, the hot water valve 92, and the boiler water make-up valve 75.

Referring initially to FIG. 16, operation of the apparatus and method of the present invention proceeds as follows. The operator removes the food storage container 20 shown in FIG. 13 from a nearby refrigerated cabinet (not shown) where the temperature typically is about 38° F. The cover 26 is attached to the lip 24 of the cup 22, but the plastic lid 28 has not been attached yet.

The operator grabs the handle 36 of the door 35 in the lower section 33 of the front of the cabinet 31 as shown in FIG. 1. The operator raises the door to provide access to the entrance into the cooking chamber 37. The operator moves the still-sealed cup 22 through the entrance and into cooking chamber shown in FIGS. 2 and 4. The operator places the bottom 23 of the cup 22 as shown in FIG. 4 on the opposed ledges 50, 51 formed in bottom wall 49 of cooking chamber 37. As shown in FIG. 5, the cup 22 remains sealed with the cover 26 in place. The operator then lowers the door 35 until the entrance to the cooking chamber is closed. The operator then pushes the start button 122 shown in FIGS. 14 and 16 for example.

As shown in FIG. 15, when the door is completely closed, a flange 42 located near the bottom of the door's extrusion 38, activates a switch 43 which sends a signal to a controller (not shown in FIG. 15) indicating that the door 35 of the cooking chamber has been closed. In response to this signal, controller 80 activates extension of a solenoid of a door locking device 44 to extend the solenoid until it locates above the flange 42, thereby preventing upward movement of the door.

With the cup disposed inside the cooking container and the door closed and locked as shown in FIG. 15, the controller receives signals from the contents identifying means. If the cup is properly positioned as shown in FIG. 4 for example, then the contents identifying means will relay a signal indicative of this properly positioned condition of the cup. Assuming that the cup has been properly positioned, the contents identifying means also will detect whether the cup contains a 50/50 product or a 90/10 product or another type of product for which the controller has been programmed. For example, if the embodiment of the contents identifying means relies on two capacitance proximity sensors 102, 103 as shown in FIG. 15, then the identification of the product is made by determining where the level of solids resides inside the cup. The contents identifying means transmits the product identifying information to the controller. Depending on the identity of the product as determined by the contents identifying means, the controller selects an operating routine to govern the cooking procedure for the contents of the cup. In this way the controller regulates the amount of steam and/or hot water to be introduced into the food storage container based on the identification of the type of food stored inside the cup.

Figure 14:
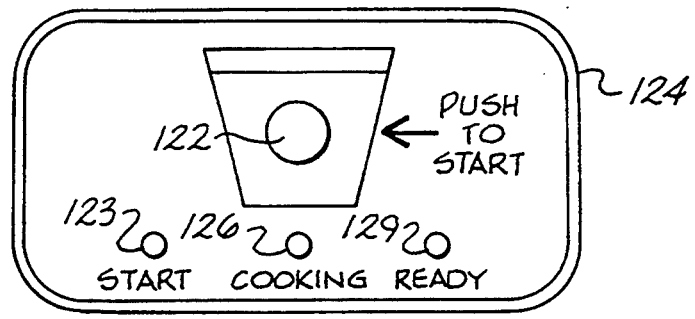
FIG. 14 illustrates a front plan view of components of a preferred embodiment of the apparatus of the present invention.

Meanwhile, as noted above, the operator has pushed the start button 122 shown in FIGS. 14 and 16. This sends a signal to the controller 80 to implement the cooking process. If the controller determines that the cup 22 is properly positioned and the door 35 is locked, the controller illuminates the yellow start light 123 on the operator panel 124 shown in FIGS. 14 and 16. If the controller fails to determine that the door is locked, the controller does not illuminate the yellow start light, and this failure alerts the operator to adjust the position of the cup and/or ensure that the door is completely lowered.

After the yellow start light is illuminated, the controller activates the drive motor 96 to rotate in the direction which lowers rack gear 94 and attached first hollow shaft 54 and nozzle 58 from the position shown in FIGS. 3–5 until the first hollow shaft and nozzle 58 have descended vertically to a position shown in FIG. 6. During this descent, the tip 63 of the conical portion of nozzle 58 applies sufficient pressure to puncture the cover 26 of the cup relatively cleanly as shown for example in FIG. 7. Upon attaining the position shown in FIG. 6, lower level limit switch 98 is activated as shown in phantom (dashed line) in FIG. 2. When so activated, lower limit switch 98 sends a signal to controller 80 along the path shown by the dashed line in FIG. 16 and another signal along the other dashed line to deactivate drive motor 96 and thereby stop the descent of nozzle 58 beyond the level indicated in FIG. 6 by the horizontal line designated by the numeral 125. In this position, the distance between the tip 63 of nozzle 58 and the bottom 23 of the cup 22 is approximately one-quarter inch. As shown in FIGS. 5 and 6, the maximum length of first hollow shaft 54 extending into the cup is indicated by the vertical line 100 with arrows at opposite ends.

Once nozzle 58 is disposed as shown in FIGS. 6 and 7, the controller selects the proportions of steam and hot water (if any is called for by the type of product) to be introduced under pressure into the cup 22 from the boiler 66 via hot water take-off line 90, steam take-off line 67, hot water solenoid valve 92, first steam solenoid valve 88, common manifold 89, flexible hose 56, and the first hollow shaft 54, as shown in FIG. 16. When the controller operates the solenoids to open the valve or valves to provide steam and/or hot water to start the cooking process, a red light 126 is illuminated on the operator panel 124 (FIGS. 14 and 16) to indicate the cooking process is under way. Controller 80 regulates the amount of steam and hot water permitted to flow through the openings 62 in nozzle 58 into the cup according to the type of product that has been detected by the contents identifying means. Controller 80 regulates these amounts of steam and hot water based on the pressure control settings and temperature control settings which determine the pressure inside boiler 66 and the quality of steam available. As shown in FIG. 7, when the steam and/or hot water is introduced under pressure into the bottom portion of the cup 22, the contents of the cup not only are heated but also mixed and agitated to ensure rapid and even cooking.

For some food products such as a viscous product like chilies and stews, the controller can be programmed to introduce the steam in a series of short bursts of steam to obtain a pulsating effect that has been found most effective for promoting satisfactory heating and mixing of such types of food products. The reason for pulsing the injection of steam into dense products such as chilies and stews, is that the injection of the steam creates a void. It is desirable to allow the void to collapse so that the food surrounding the void will absorb the heat content of the steam before additional charges of steam are injected into the food product. A typical cycle for heating dense products with the boiler pressure maintained at just under 1.0 bar, consists of 12 seconds of steam injection followed by 3 seconds without steam being introduced. Four repetitions of this cycle can be used to introduce approximately 1 fluid ounce of liquid in the form of condensed steam into the food.

In a 50/50 type product, controller 80 is programmed so that initially hot water is injected into the cup by controlling the hot water solenoid valve 92 and the first steam solenoid valve 88 accordingly. Once about 4 ounces of hot water has been introduced into the cup 22, controller 80 is programmed to turn off the hot water valve 92 and open the first steam solenoid valve 88 to begin the introduction of steam into the cup 22.

If the unit 30 is designed to keep the pressure inside boiler 66 below 1.0 bars, then desirably the steam provided from the boiler 66 is at a pressure of about 0.8 bars and is superheated to a temperature of about 235° F., which is also the temperature of the water leaving the boiler. It is estimated that by the time the steam and water are exiting the nozzle 58, the temperature is around 210° F. However, certain cooking procedures may be conducted at higher pressures and thereby reduce the cooking time required for a particular food product.

When the steam is being introduced into the cup 22, the controller 80 is programmed to begin operating the drive motor 96 to retract the nozzle 58 and first hollow shaft 54 from within the cup by lifting the nozzle and first hollow shaft vertically toward the top wall 48 of the cooking chamber 37 as shown in FIG. 8. Almost simultaneous with the initiation of retraction of first hollow shaft 54 from inside the cup, the controller operates the solenoid to open second steam valve 112 to provide a steam bath within confinement cylinder 106 for the first hollow shaft and the nozzle during retraction of same as schematically shown in FIGS. 8 and 9. This steam bath sanitizes and cleanses the first hollow shaft 54 and nozzle 58 of any food particles that otherwise might adhere to the exterior surfaces of the first hollow shaft and the nozzle.

When the first hollow shaft 54 and nozzle 58 have attained the orientation shown in FIG. 5, the controller operates the solenoid to close second steam valve 112 and stop the flow of steam through second hollow shaft 104 to steam confinement cylinder 106. In addition, as shown in FIGS. 2 and 16, upper level limit switch 99 is engaged by the flange 128 of the rack gear 94. As schematically shown in FIG. 16, upper level limit switch 99 sends a signal (indicated by the dashed line) to controller 80 and another signal (indicated by the dashed line) to deactivate motor 96 and thereby stop the vertical ascent of rack gear 94 and attached first hollow shaft 54 and nozzle 58.

As shown in FIG. 5, the portion of the first hollow shaft 54 that is disposable inside the cup 22 is retained inside the cooking chamber 37. This is schematically indicated in FIG. 5 by the vertical line designated 100 with the arrows at its opposite ends. This ensures that the portion of the hollow shaft that might contact the foodstuff inside the cup, never moves outside of the cooking chamber and thus cannot be contacted by contaminants that might exist outside of the cooking chamber of the apparatus.

This completes the cooking process and the process of sanitizing and cleansing the nozzle 58 and first hollow shaft 54. The controller 80 is desirably programmed so that when the cooking process is completed, the controller causes the red light 126 on the panel shown in FIGS. 14 and 16 to be turned off and a green light 129 to be illuminated to indicate that the cooked product is ready to be removed from the cooking chamber. The controller is also desirably programmed to activate an audible signal such as a buzzer 131 (FIG. 16) in concert with illumination of the green light 129. In addition, the controller is programmed to operate the solenoid of the door locking mechanism 44 shown in FIG. 15 to retract and thereby release the door 35 so that it may be raised manually by the operator to permit access to the cup 22 via the entrance to cooking chamber 37. A lid 28 may be attached to the cup 22, either before or after removing the punctured cover 26.

The controller can be programmed for automatically sanitizing the container isolating means. Periodically, such as every 30 minutes (or every 30 minutes of consecutive non-use of the cooking chamber as determined by the information supplied to the controller by the proximity sensors), the controller will operate a sanitizing and cleansing cycle for the container isolating means. The controller will check the status of the switch 43 indicating that the door 35 is in the fully lowered and closed position. The controller will check the status of the upper limit switch 99 indicating that the nozzle is in its fully retracted position and disposed at its maximum height position above the bottom wall 49 of the cooking chamber 37. As shown in FIG. 10 for example, controller 80 then opens hot water solenoid valve 92 for a predetermined time to provide hot water under pressure from the boiler through the openings 62 in nozzle 58. As shown in FIG. 10, a pressurized spray of hot water 130 washes down all of the interior surfaces of the cooking chamber disposed beneath the maximum retraction height of nozzle 58. As shown in FIG. 10, the wash water falls under the force of gravity and collects in drainage channel 52 until exiting through the drain opening 53 provided at the end of drainage channel 52.

What is claimed is:

1. An apparatus for automatically cooking food in a food storage container in the course of a cooking process, the apparatus comprising:
    a means for selectively isolating the food storage container during the cooking process, said container isolating means being configured to receive a food storage container; and
    a means for introducing steam inside the food storage container received inside said container isolating means, wherein said steam introducing means includes an elongated hollow shaft disposed at least partially inside said container isolating means, wherein said steam introducing means includes a means for selectively disposing said hollow shaft in communication with the inside of the food storage container received inside said container isolating means, wherein said hollow shaft disposing means includes:
        a rack gear connected to said hollow shaft;
        a rotatable pinion gear disposed in engagement with said rack gear; and
        an electric drive motor having a rotatable shaft connected to rotate said pinion gear.

2. An apparatus as in claim 1, wherein:
    said container isolating means includes a bottom wall configured to receive the food preparation container;
    said steam introducing means includes a nozzle connected to the end of said hollow shaft disposed inside the food storage container, said nozzle defining at least one outlet opening therethrough; and
    said hollow shaft disposing means includes a means for vertically positioning at least one said nozzle outlet opening at a first predetermined height above said bottom wall.

3. An apparatus as in claim 2, wherein said means for vertically positioning said at least one nozzle outlet opening, includes at least one limit switch electrically connected to said electric motor and disposed to be engaged by said rack gear.

4. An apparatus as in claim 1, wherein:
    said hollow shaft disposing means includes a means for preventing a predetermined portion of said hollow shaft from leaving the confines of said container isolating means.

5. An apparatus as in claim 4, wherein said means for preventing a predetermined portion of said hollow shaft from leaving the confines of said container isolating means, includes at least one limit switch electrically connected to said electric motor and disposed to be engaged by said rack gear.

6. An apparatus for automatically cooking food in a food storage container in the course of a cooking process, the apparatus comprising:
    a means for selectively isolating the food storage container during the cooking process, said container isolating means being configured to receive a food storage container;
    a means for introducing steam inside the food storage container received inside said container isolating means; and
    a means for introducing hot water inside the food storage container received inside said container isolating means, wherein said means for introducing hot water inside the food storage container received inside said container isolating means includes a solenoid actuated hot water valve.

7. An apparatus as in claim 6, further comprising:
    a means for automatically sanitizing said steam introducing means.

8. An apparatus as in claim 6, further comprising:
    a means for automatically sanitizing said container isolating means.

9. An apparatus as in claim 6, further comprising a means for varying the cooking times of the cooking process.

10. An apparatus as in claim 6, further comprising:
    a means for varying the relative proportions of water in steam introduced into the food storage container via said respective steam introducing means and hot water introducing means.

11. An apparatus as in claim 6, further comprising:
    a means for determining whether the food storage container is properly oriented within said container isolating means to enable performance of the necessary operations to effect the cooking process.

12. An apparatus for automatically cooking food in a food storage container in the course of a cooking process, the apparatus comprising:
    a means for selectively isolating the food storage container during the cooking process, said container isolating means being configured to receive a food storage container;
    a means for introducing steam inside the food storage container received inside said container isolating means; and
    a means for identifying the contents of the food storage container without unsealing same.

13. An apparatus for automatically cooking food stored initially inside a completely sealed container, the apparatus comprising:
    a cooking chamber, said cooking chamber including a top wall, a bottom wall disposed generally opposed to said top wall, and a back wall disposed generally to extend between said top wall and said bottom wall;
    a moveable door configured and disposed to provide operator access to said cooking chamber to permit a food product to be selectively inserted into, enclosed within, and removed from said cooking chamber;
    an electric solenoid locking mechanism configured and disposed to prevent movement of said door to said cooking chamber;
    a steam boiler;
    an electric heater configured and disposed to provide heat to generate steam inside said steam boiler;
    a pressure sensor configured and disposed to sense the pressure inside said steam boiler;

a boiler controller connected to receive pressure information from said pressure sensor, said boiler controller being connected to control said heater depending upon the pressure information received from said pressure sensor;

a manual shut-off valve connected in communication with said boiler;

a water filter disposed in communication with said boiler;

a filtering cartridge disposed in said water filter;

a first solenoid steam valve connected in communication with said boiler;

a hot water solenoid valve connected in communication with said boiler;

a second solenoid steam valve connected in communication with said boiler;

an elongated first hollow shaft connected in communication with said first solenoid steam valve and said hot water solenoid valve;

a first opening defined through said top wall of said cooking chamber for receiving said first shaft therethrough;

a sealing gasket disposed between said first opening in said top wall and said first shaft for providing a seal between said first opening and said first shaft;

a portion of said first shaft being disposed through said first opening to extend inside said cooking chamber and defining a free end of said first shaft disposed inside said cooking chamber;

a nozzle disposed at said free end of said first shaft located within said cooking chamber, said nozzle being configured with a conical end portion having at least one outlet opening to permit the passage of steam and hot water therethrough;

a rack gear connected to the end of said shaft opposite the end connected to said nozzle;

an electric drive motor connected to operate said rack gear;

a first limit switch electrically connected to said electric motor and configured and disposed to be activated by said rack gear at one extreme limit of travel of said rack gear;

a second limit switch electrically connected to said electric motor and configured and disposed to be activated by said rack gear at a second extreme limit of travel of said rack gear;

a second opening defined through said back wall of said cooking chamber and disposed at a predetermined height above said bottom wall of said cooking chamber;

a second elongated hollow shaft disposed through said second opening with a free end disposed inside said cooking chamber;

a steam confinement cylinder disposed on said free end of said second shaft, said steam confinement cylinder defining a central opening therethrough, said central opening of said steam confinement cylinder being aligned to receive said first shaft therethrough during the path of travel of said first shaft according to operation of said rack gear;

said steam confinement cylinder defining at least one fluid opening configured for the passage of steam therethrough;

the end of said second shaft opposite the end connected to said steam confinement cylinder being connected in communication with said second solenoid steam valve;

a programmable controller electrically connected to control said drive motor, said solenoid locking mechanism and each of said solenoid valves;

a start switch electrically connected to said programmable controller;

a drain channel formed in said bottom wall and defining a depressed portion of said bottom wall;

a drain opening formed in said drain channel to permit removal of waste material from said cooking chamber;

a pair of capacitance proximity sensors disposed to sense the presence of a cooking product within said cooking chamber, each said proximity sensor being connected in electrical communication with said programmable controller;

an electrical transformer connected in communication with said programmable controller;

an electrical plug and an electrical cord electrically connected to said electrical plug, said electrical cord being electrically connected in communication with said electrical transformer;

a high temperature cutout and manual reset connected in communication with said heater;

a lighted control panel connected in communication with said start switch and said programmable controller; and a buzzer connected in electrical communication with said programmable controller.

* * * * *